United States Patent

[11] 3,595,566

[72] Inventors Howard I. Jarmy
San Francisco;
Gary D. Oates, Los Gatos, both of, Calif.
[21] Appl. No. 809,352
[22] Filed Mar. 21, 1969
[45] Patented July 27, 1971
[73] Assignee Singer-General Precision Inc.
Binghamton, N.Y.

[54] AUTOMATIC APERTURE CARD TRANSPORT
8 Claims, 7 Drawing Figs.

[52] U.S. Cl. .......... 271/53
[51] Int. Cl. .......... B65h 9/06
[50] Field of Search .......... 271/51, 52, 53, 57, 48; 355/75, 76, 64; 353/103, 104

[56] References Cited
UNITED STATES PATENTS

| | | | |
|---|---|---|---|
| 2,880,647 | 4/1959 | Swinnerton .......... | 271/37 X |
| 3,288,027 | 11/1966 | Ruzicka .......... | 355/75 |
| 3,472,373 | 10/1969 | Dillingham et al. .......... | 271/52 X |

*Primary Examiner*—Joseph Wegbreit
*Attorneys*—Francis L. Masselle, William Grobman and Andrew G. Pullos

ABSTRACT: The disclosed embodiment of the present invention is an aperture card transport which includes a card guide, a solenoid-actuated platen, a plurality of rollers for conveying the card through the guide, and a solenoid-actuated card stop. A pair of light sources and photosensitive diodes are positioned to sense the leading edge of the card. Logic circuitry responsive to the diodes controls the rollers, platen solenoid, and card stop solenoid to control the movement of the card through the guide.

INVENTORS
HOWARD I. JARMY
GARY D. OATES
BY

INVENTORS
HOWARD I. JARMY
GARY D. OATES
BY
Andrew M. Pillos

INVENTORS
HOWARD I. JARMY
GARY D. OATES
BY

INVENTORS
HOWARD I. JARMY
GARY D. OATES
BY

INVENTORS
HOWARD I. JARMY
GARY D. OATES
BY

AUTOMATIC APERTURE CARD TRANSPORT

This invention relates generally to an aperture card transport and more particularly to a transport which accurately positions an aperture card with respect to an associated optical system and automatically moves the card into and out of a scanning station.

The present invention has particular application as an aperture card transport for use with a high-resolution CRT scanning system. In such a scanning system, it is necessary for an operator to feed an aperture card into a scanning station, register the microfilm in three orthogonal directions with respect to the optical system, assure that the microfilm is flat across its entire surface, and eject the card after a prescribed scanning interval.

Accordingly, it is an object of the present invention to provide an aperture card transport which automatically positions a card with a high degree of accuracy at a scanning station.

Another object of the present invention is to provide an aperture card transport which can be accurately positioned with respect to an associated optical system.

Still another object of the present invention is to provide an aperture card transport which maintains a relatively high degree of flatness of the microfilm at the scanning station.

Yet another object of the present invention is to provide an aperture card transport which is capable of transporting a card to a scanning station, positioning the card at such station during a scanning operation, and transporting the card away from such station automatically.

These and other objects, features and advantages of the present invention will be more fully realized and understood from the following detailed description when taken into conjunction with the accompanying drawings, wherein.

Figure 1:
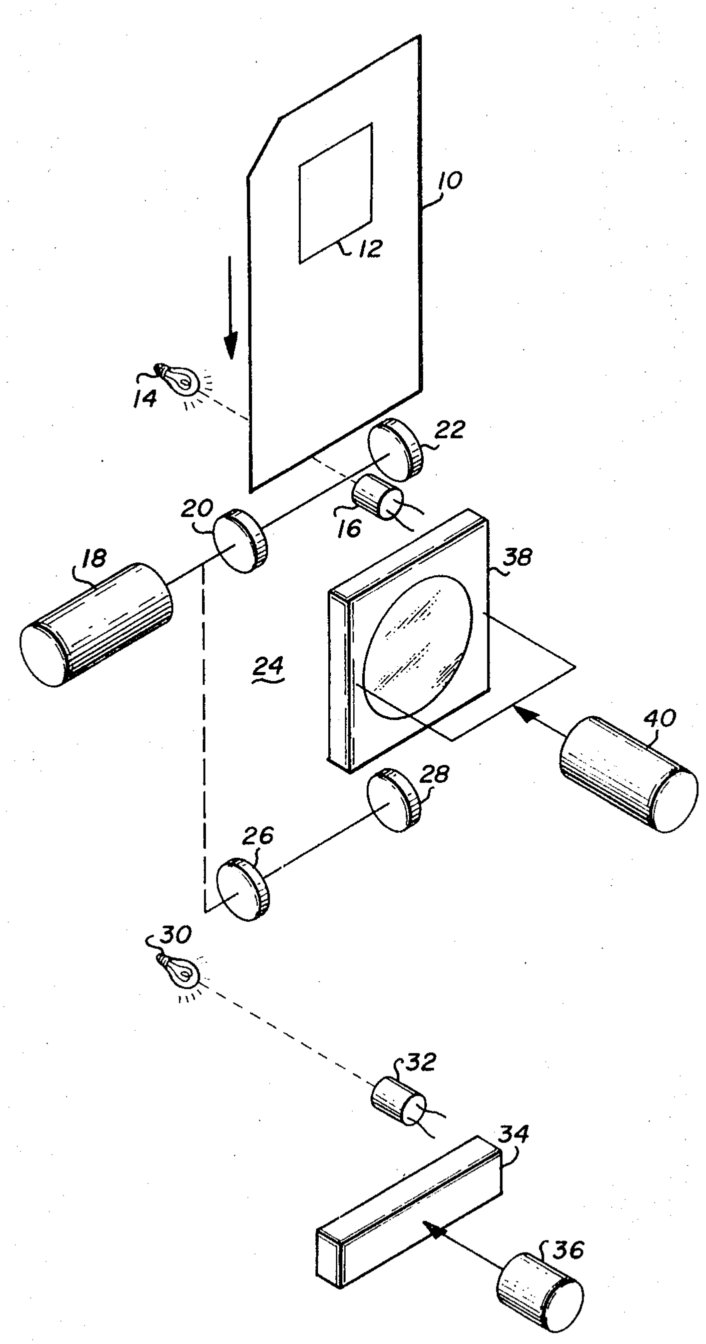
FIG. 1 is a perspective view schematically illustrating the operational portion of an aperture card transport card constructed in accordance with the principles of the present invention.

With reference to FIG. 1, there is shown an aperture card 10 containing a microfilm 12 which is positioned to be moved in a direction indicated by the arrow attached thereto. A light source 14 and photo sensitive diode 16 are positioned on opposite sides of the path of travel of the aperture card 10. When the aperture 10 is interposed between the light source 15 and the photosensitive diode 16, an output is provided from the diode 16. A motor 18 is connected to a first set of rollers 20 and 22 which engage the aperture card 10 to convey it to a scanning station, generally designated with the reference numeral 24. The motor 18 is also connected to a pair of rollers 26 and 28 which receive the aperture card 10 from the rollers 20 and 22. Another light source 30 and photosensitive diode 32 are positioned on opposite sides of the path of travel of the card. A card stop 34 is movable into and out of the path of travel of the aperture card 10 by means of the solenoid 36 connected thereto. A platen 38 is disposed for engaging the aperture card in response to energization of a solenoid 40 connected thereto.

Upon insertion of the aperture card 10 into the transport, an output is provided from the diode 16 to actuate the motor 18. The rollers 20 and 22 transport the aperture card 10 into engagement with the rollers 26 and 28. Additional travel of the aperture card 10 interrupts the light impinging on the diode 32 to provide an output pulse therefrom. The output pulse from the diode 16 is also employed for actuating the solenoid 36 to place the stop 34 in the path of travel of the aperture card 10. An output from the diode 32 is effective to actuate the solenoid 40 and depress the platen 38 against the microfilm 12. In addition, the output from the diode 32 deenergizes the light source 14 and the motor 18, such that if an additional aperture card is inserted into the transport, the system will not react thereto.

Figure 2:
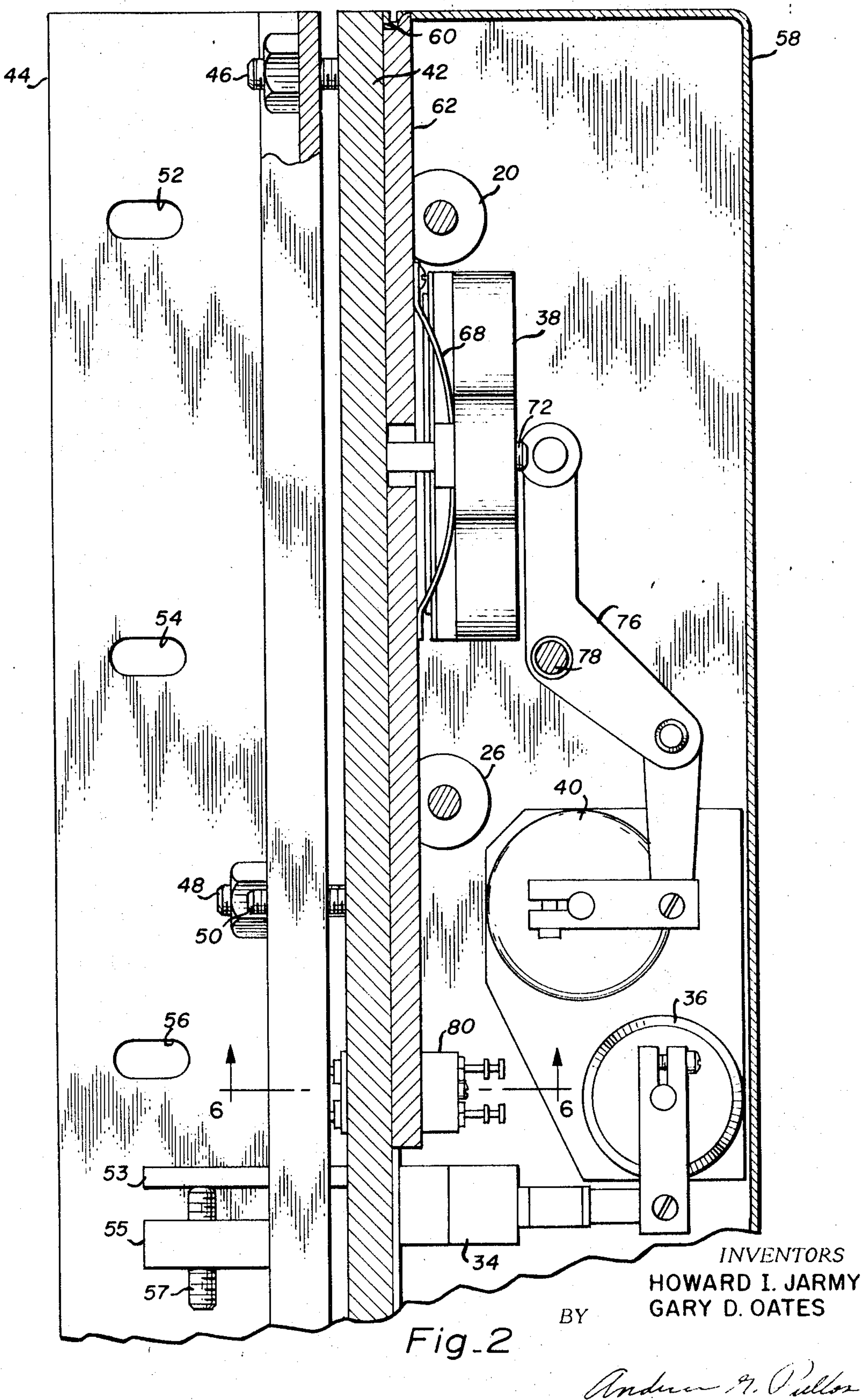
FIG. 2 is a side view partly in section of one preferred embodiment of the present invention.

FIG. 2 is a side elevational view partly in section of one preferred embodiment of the present invention. As shown therein, a baseplate 42 is secured to a support plate 44 by means of studs 46 and 48. A space is maintained between the baseplate 42 and the support plate 44 by means of a plurality of screws 50 (only one of which is shown in FIG. 2). The support plate 44 is provided with a flange having a plurality of holes 52, 54 and 56 which are elongated to permit relative motion and positioning of the support plate 44. A bracket 53 is secured to the baseplate 42 and a boss 55 is secured to the support plate 44. An adjusting screw 57 extending through the boss 55 and engages the bracket 53 to permit relative adjustment between the plates 42 and 44. The mounting of the baseplate 42 to the support plate 44 permits relative movement therebetween to accurately position the transport mechanism.

A housing 58 is secured to the baseplate 42. A gap between the baseplate 42 and the housing 58 defines a slot 60 through which an aperture card can be inserted. A pair of guides 62 and 64 (see FIGS. 3 and 5) are mounted on the baseplate 42 and are disposed for receiving an aperture card therein.

When the aperture card 10 is inserted into the slot 60, the diode 16 produces an output to actuate the rollers 20 and 22. The rollers 20 and 22 are preferably formed of rubber or similar material. The aperture card is transferred through the guide 62 and 64 by means of the rollers 20 and 22 to the rollers 26 and 28. The rollers 26 and 28 are preferably formed of highly polished steel, such that any slippage on the aperture card will not cause any damage thereto. The motor 18 is connected directly to the shaft supporting the rollers 20 and 22 which is in turn connected by means of a belt 66 to the shaft supporting the rollers 26 and 28.

Figure 3:
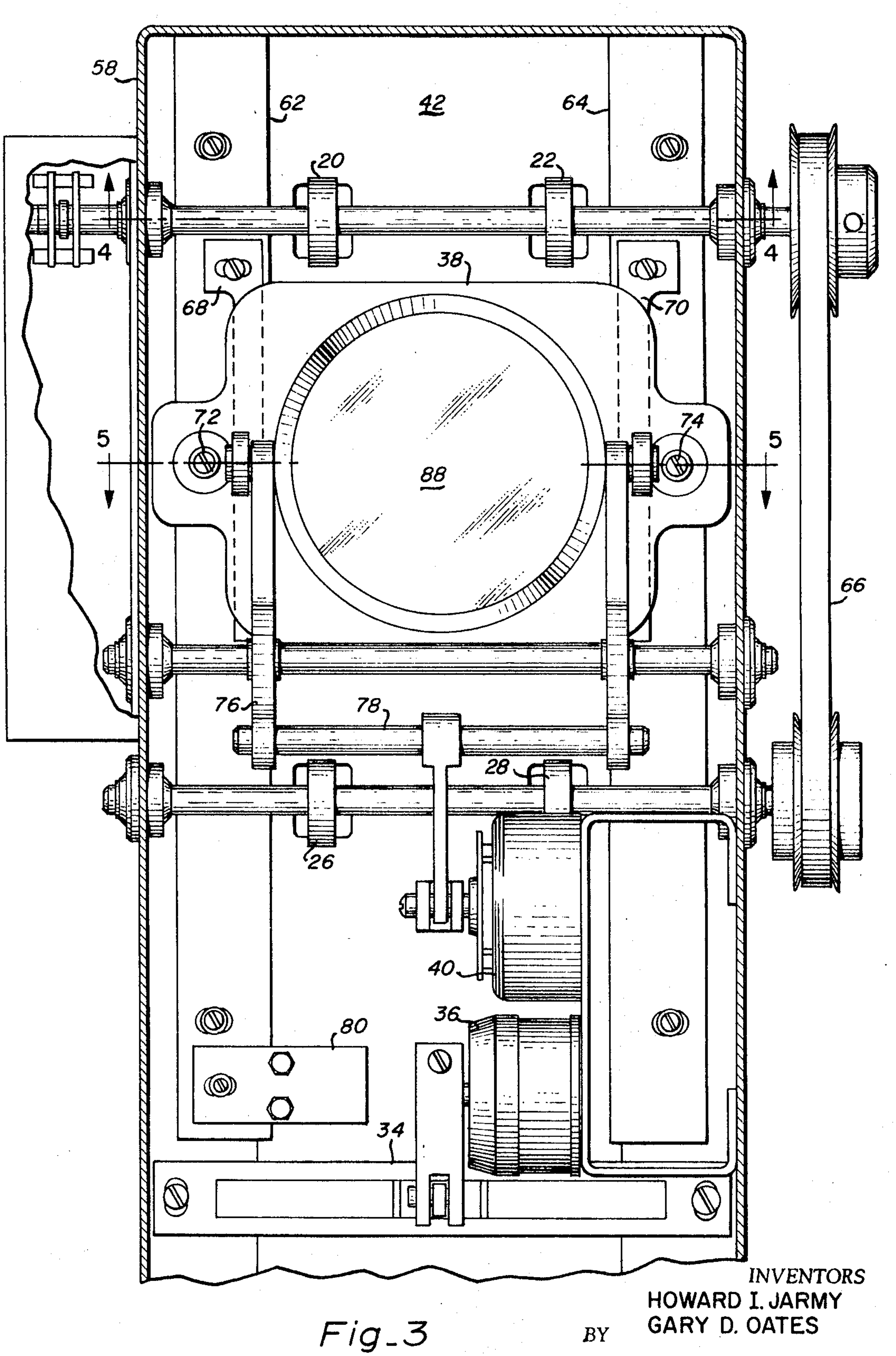
FIG. 3 is a plan view partly in section of the aperture card transport illustrated in FIG. 2.

The rollers 26 and 28 convey the aperture card downwardly as shown in FIGS. 2 and 3 until a leading edge thereof abuts against the stop 34. When the aperture card has come to rest against the stop 34, the microfilm thereon is positioned under the platen 38. The platen 38 is supported by means of leaf springs 68 and 70 and is guided on a pair of pins 72 and 74. A linkage arm 76 which is pivoted on a shaft 78 is connected between the solenoid 40 and the platen 38. The light source 30 and diode 32 are contained in an assembly which is generally designated with the reference numeral 80.

Figure 4:
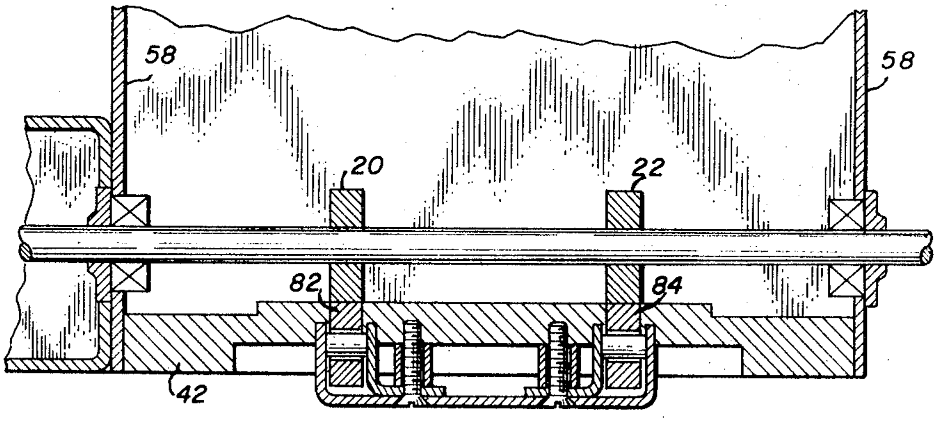
FIG. 4 is a sectional view taken alone line 4—4 in FIG. 3.

As shown in FIG. 4, a pair of idler rollers 82 and 84 are journaled in the baseplate 42 and cooperate with the rollers 20 and 22, respectively, to engage an aperture card therebetween. Similar idler rollers are associated with the rollers 26 and 28. These idler rollers are adjustable as shown in FIG. 4.

Figure 5:
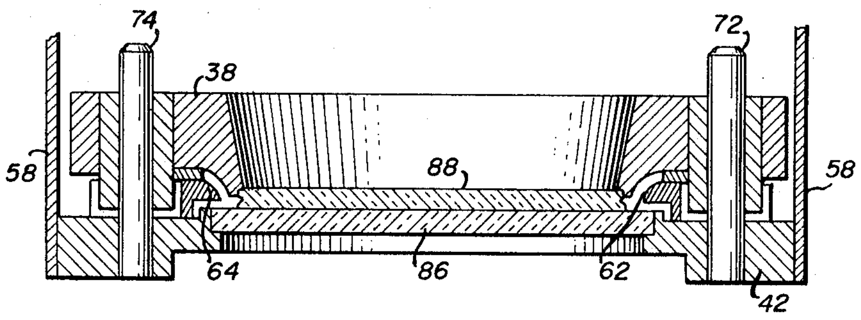
FIG. 5 is a sectional view taken along line 5—5 in FIG. 3.

As shown in FIG. 5, the baseplate 42 is provided with a glass plate 86 at the scanning station which corresponds with a glass plate 88 in the platen 38.

Figure 6:
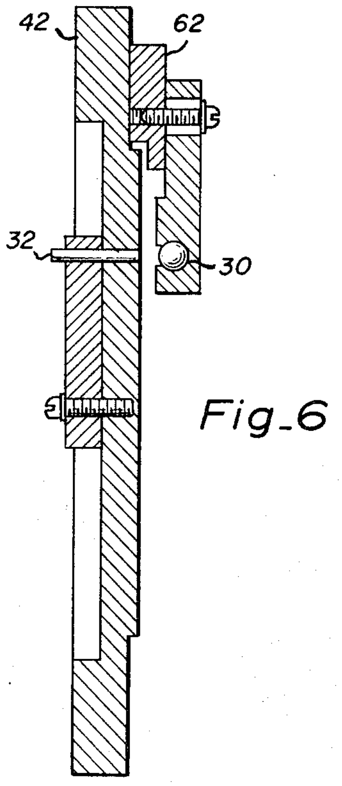
FIG. 6 is a sectional view taken along lines 6—6 in FIG. 2.

FIG. 6 illustrates in greater detail the assembly 80 which contains the light source 30 and photosensitive diode 32 which are disposed on opposite sides of the path of travel of an aperture card.

Figure 7:
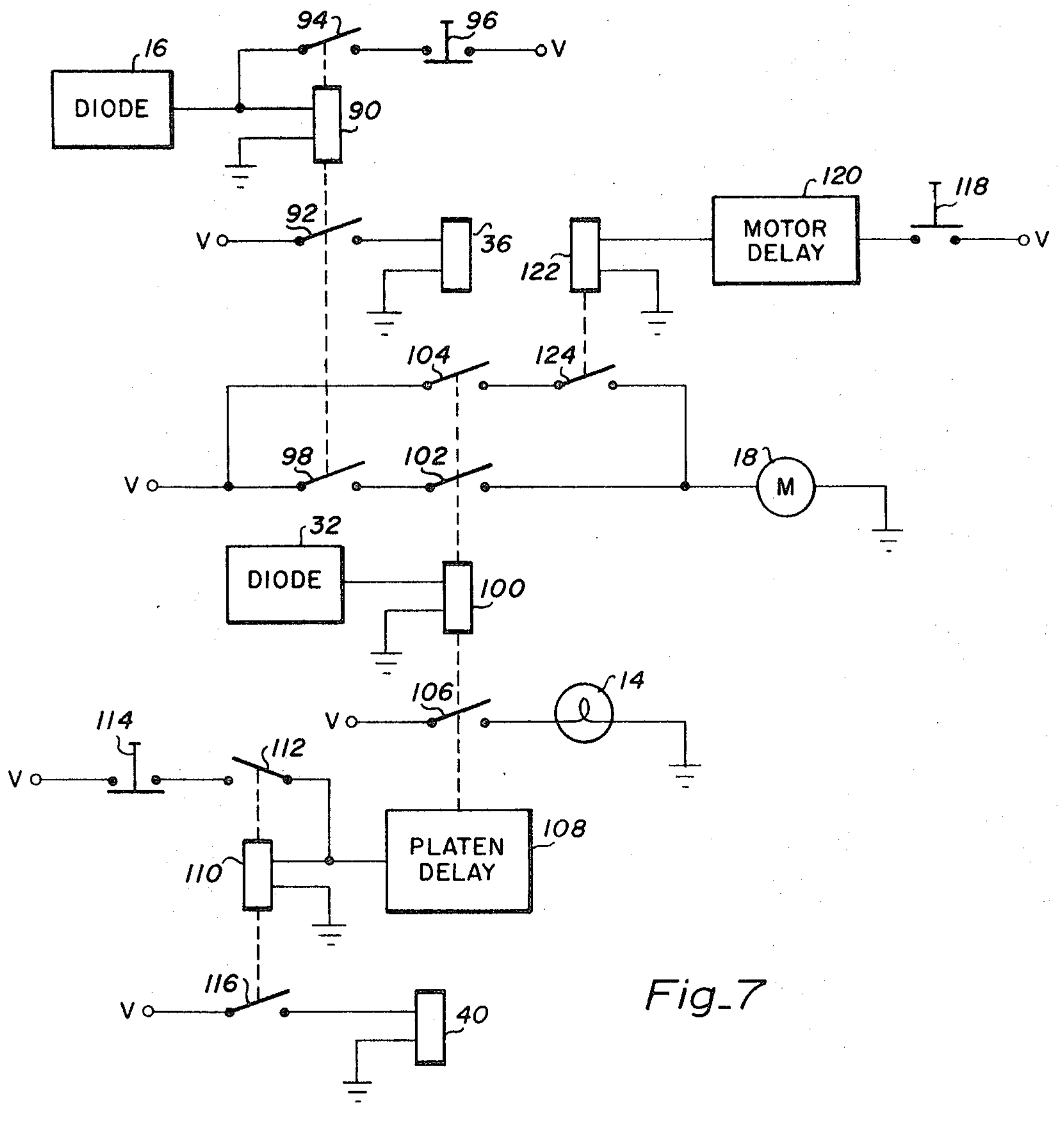
FIG. 7 is a partial schematic and partial block diagram of the logic circuit employed in conjunction with the present invention. Like reference numerals throughout the various view of the drawings are intended to designate the same or similar structures.

The logic circuit illustrated in FIG. 7 controls the operation of the aperture card transport. When an operator inserts a card, the light path is broken between the light source 14 and the diode 16. As a result, a relay 90 is actuated which, in turn, closes a switch 92 to connect a source of voltage to the solenoid 36. In addition, the relay 90 closes a switch contact 94 which is connected in series with a switch 96 to connect a voltage to its input. In addition, the relay 90 closes a switch contact 98 to connect a source of voltage to the motor 18.

When the light path to the diode 32 is broken, a relay 100 connected thereto is energized to open a switch contact 102, thereby disconnecting the motor 18. In addition, the relay 100 closes a switch contact 104 which initially has no effect on the circuit connecting the source of voltage to the motor 18. In addition, the relay 100 opens a switch contact 106 to deenergize the light source 14. The relay 100 initiates a platen delay 108 which provides an output to a relay 110 after a predetermined time period, such as 500 milliseconds. The relay 110 is self latching by means of a switch contact 112 connected in series with a switch 114. The relay 110 is self-latching by means of a switch contact 112 connected in series with a switch 114. The relay 110 also closes a switch contact 116 which connects a source of voltage to the solenoid 40 causing the platen to be depressed against the aperture card. The aperture card is now properly positioned and the transport is in readiness for a scanning operation to be performed.

After the scanning operation is performed, switch contacts 96 and 114 and a switch contact 118, all of which may be ganged together are actuated. The switch contact 96 opens the circuit to the relay 90 causing the solenoid 36 to drop out. Actuation of the switch contact 114 deenergizes the relay 110 which, in turn, causes the solenoid 40 to drop out. Actuation of the switch contact 118 initiates a motor delay 120 which, after a predetermined time period such as 200 milliseconds, energizes a relay 122. The relay 122 closes a switch contact 124 to connect a source of voltage to the motor 18. After the aperture card has passed the diode 32, the motor 18 will be deenergized and the light source 14 will be energized.

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

The invention we claim is:

1. A card transport, comprising
   a. a pair of card edge retainers and guides extending across a scanning station,
   b. a first roller positioned on one side of the scanning station and disposed for engaging a card and conveying such card toward the scanning station,
   c. a second roller positioned on the other side of the scanning station a distance from said first roller less than the length of a card and disposed for engaging a card,
   d. means for driving said first roller and said second roller,
   e. a stop positioned adjacent the path of travel of a card through said guides and being positioned on one side of said second roller away from the scanning station,
   f. means for moving said stop into the path of travel of a card through said guides, and
   g. first means positioned on one side of said first roller away from the scanning station for sensing a leading edge of a card and energizing said drive means and said moving means.

2. A card transport as defined in claim 1, further comprising a platen at said scanning station, and means for moving said platen onto a card positioned thereat.

3. A card transport as defined in claim 1, further comprising second means positioned between said stop and the scanning station for sensing a leading edge of a card and deenergizing said drive means in response thereto.

4. A card transport as defined in claim 1, further comprising a platen at said scanning station, means for moving said platen onto a card positioned thereat, second means positioned between said stop and the scanning station for sensing a leading edge of a card and deenergizing said drive means and energizing said platen moving means in response thereto.

5. A card transport as defined in claim 4, wherein said second sensing means is responsive to the passage of a leading edge of a card to disable said first sensing means.

6. A card transport as defined in claim 4, further comprising means responsive to a predetermined condition for deenergizing said platen moving means and said stop moving means and for energizing said drive means.

7. A card transport as defined in claim 6, wherein said second sensing means is responsive to the passage of a trailing edge of a card for deenergizing said drive means.

8. A card transport as defined in claim 7, wherein said second sensing means is responsive to the passage of a trailing edge of a card for enabling said first sensing means.